US009802319B2

United States Patent
Kiyosawa

(10) Patent No.: US 9,802,319 B2
(45) Date of Patent: Oct. 31, 2017

(54) ROBOT, ROBOT SYSTEM, AND CONTROL METHOD

(71) Applicant: Seiko Epson Corporation, Tokyo (JP)

(72) Inventor: Yuki Kiyosawa, Matsumoto (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 14/726,992

(22) Filed: Jun. 1, 2015

(65) Prior Publication Data

US 2015/0343643 A1    Dec. 3, 2015

(30) Foreign Application Priority Data

Jun. 2, 2014  (JP) .................................. 2014-114287

(51) Int. Cl.
G05B 15/00    (2006.01)
G05B 19/00    (2006.01)
B25J 9/16     (2006.01)

(52) U.S. Cl.
CPC ... B25J 9/1697 (2013.01); *G05B 2219/40487* (2013.01); *G05B 2219/45064* (2013.01); *Y10S 901/30* (2013.01); *Y10S 901/47* (2013.01)

(58) Field of Classification Search
CPC ... B25J 9/16; B25J 9/1697; B25J 13/08; B25J 15/04; G05B 2219/40487; G05B 2219/45064; Y10S 901/47; Y10S 901/30; B23P 19/007; B23P 19/06; B23P 19/066; B23P 19/10
See application file for complete search history.

(56) References Cited

U.S. PATENT DOCUMENTS

| 4,835,450 | A | * | 5/1989 | Suzuki | ................. B25J 9/1679 318/568.13 |
|---|---|---|---|---|---|
| 6,209,426 | B1 | | 4/2001 | Takahashi | |
| 6,414,711 | B2 | | 7/2002 | Arimatsu et al. | |
| 7,549,204 | B1 | * | 6/2009 | Vangal-Ramamurthy | B23P 19/007 29/407.02 |
| 2004/0140787 | A1 | | 7/2004 | Okamoto et al. | |
| 2006/0012197 | A1 | | 1/2006 | Anderson et al. | |
| 2006/0012198 | A1 | | 1/2006 | Hager et al. | |
| 2006/0074526 | A1 | | 4/2006 | Watanabe et al. | |
| 2009/0285664 | A1 | | 11/2009 | Kim et al. | |
| 2010/0185327 | A1 | | 7/2010 | Nakajima et al. | |
| 2011/0153076 | A1 | * | 6/2011 | Noro | ................. B25J 9/1687 700/245 |
| 2011/0166709 | A1 | | 7/2011 | Kim et al. | |
| 2011/0185556 | A1 | | 8/2011 | Hirano et al. | |
| 2012/0059517 | A1 | | 3/2012 | Nomura | |
| 2012/0173019 | A1 | | 7/2012 | Kim et al. | |
| 2012/0175904 | A1 | | 7/2012 | Murakami et al. | |
| 2012/0228892 | A1 | | 9/2012 | Urabe et al. | |

(Continued)

FOREIGN PATENT DOCUMENTS

JP    2012-035391 A    2/2012
JP    2014-018909 A    2/2014

*Primary Examiner* — Rachid Bendidi
(74) *Attorney, Agent, or Firm* — Harness, Dickey & Pierce, P.L.C.

(57) ABSTRACT

A robot includes an operation execution unit; and a control unit which controls the operation execution unit, in which the control unit assembles an operation member at an assembly position by the operation execution unit and determines a state of fastening based on a captured image including the assembly position.

7 Claims, 6 Drawing Sheets

(56) References Cited

U.S. PATENT DOCUMENTS

| | | |
|---|---|---|
| 2012/0286535 A1 | 11/2012 | Murakami et al. |
| 2012/0294509 A1 | 11/2012 | Matsumoto |
| 2013/0085604 A1 | 4/2013 | Irie et al. |
| 2013/0138244 A1 | 5/2013 | Nagasaka et al. |
| 2013/0218324 A1* | 8/2013 | Furuya ............... B25J 9/1687 700/192 |
| 2013/0245824 A1* | 9/2013 | Barajas ............... B25J 9/1664 700/253 |
| 2013/0341945 A1 | 12/2013 | Saka et al. |
| 2014/0025205 A1* | 1/2014 | Inazumi ............... B25J 9/1694 700/258 |
| 2014/0094951 A1* | 4/2014 | Sasa ............... B25J 9/1612 700/118 |
| 2015/0290811 A1* | 10/2015 | Everard ............... B25J 9/1697 348/92 |

\* cited by examiner

ROBOT, ROBOT SYSTEM, AND CONTROL METHOD

BACKGROUND

1. Technical Field

The present invention relates to a robot, a robot system, a control device, and a control method.

2. Related Art

A technology of causing a robot to perform an operation using a tool has been investigated and developed.

A technology of directly connecting an end effector as the tool, to an arm of the robot has been proposed (see JP-A-2012-35391).

However, in the robot of the related art, in a case where assembly has failed, when an operation member is assembled at an assembly position by a robot, the robot performs the next operation, regardless of the failure state of the assembly, and accordingly, the next operation may fail. More specifically, when fastening has failed when a screw is fastened to a screw hole by a driver grasped by the robot, the screw may remain supplied to a tip of the driver. In this case, in the robot of the related art, even when a new screw is attempted to be supplied to the tip of the driver, for example, the supply of the new screw may fail, because the screw previously supplied to the tip thereof still remains.

SUMMARY

An advantage of some aspects of the invention is to provide a robot, a robot system, a control device, and a control method which can remove an operation member supplied to and remaining on an operation execution portion according to a state of assembly of the operation member.

An aspect of the invention is directed to a robot including: an operation execution unit; and a control unit which controls the operation execution unit, in which the control unit determines a state of fastening based on a captured image including an assembly position, after fastening an operation member at the assembly position by the operation execution unit, and removes the operation member from the operation execution unit, when it is determined that the fastening has failed.

With this configuration, the robot determines the state of the fastening based on the captured image including the assembly position, after fastening the operation member at the assembly position by the operation execution unit, and removes the operation member from the operation execution unit, when it is determined that the fastening has failed. Therefore, the robot can remove the operation member which is supplied to and remaining on the operation execution unit according to the state of the fastening of the operation member.

In another aspect of the invention, in the robot, the control unit may determine the state of the fastening from the fact of whether or not the operation member is detected at the assembly position in the captured image.

With this configuration, the robot determines the state of the fastening from the fact of whether or not the operation member is detected at the assembly position in the captured image. Therefore, the robot can perform different operations in a case where the operation member is detected at the assembly position in the captured image and in a case where the operation member is not detected at the assembly position in the captured image.

In another aspect of the invention, in the robot, the control unit may grasp a target to be grasped by the operation execution unit and assemble the operation member at the assembly position by the target to be grasped.

With this configuration, the robot grasps the target to be grasped by the operation execution unit and assembles the operation member at the assembly position by the target to be grasped. Therefore, the robot can perform the operation according to an operation implementation state of the target to be grasped.

In another aspect of the invention, in the robot, the control unit may determine the state of the fastening based on the captured image by pattern matching.

With this configuration, the robot determines the state of the fastening based on the captured image by pattern matching. Therefore, the robot can determine the state of fastening using the pattern matching.

In another aspect of the invention, in the robot, the control unit may assemble the operation member or a new operation member at the assembly position again by the operation execution unit, when the removing operation is performed.

With this configuration, the robot assembles the operation member used in the assembling or the new operation member at the assembly position again by the operation execution unit, when the removing operation is performed. Therefore, an additional operation by a user is not necessary, for example, and the robot can perform the fastening of the operation member at the fastening position again.

Still another aspect of the invention is directed to a robot system including: a robot including an operation execution unit; and an imaging unit which captures a captured image including an assembly position where an operation member is assembled, in which the robot determines a state of fastening based on the captured image including the assembly position, after fastening the operation member at the assembly position by the operation execution unit, and removes the operation member from the operation execution unit, when it is determined that the fastening has failed.

With this configuration, the robot system determines the state of fastening based on the captured image including the assembly position, after fastening the operation member at the assembly position by the operation execution unit, and removes the operation member from the operation execution unit, when it is determined that the fastening has failed. Therefore, the robot system can remove the operation member which is supplied to and remaining on the operation execution unit according to the state of the fastening of the operation member.

Yet another aspect of the invention is directed to a control device which operates a robot including an operation execution unit, in which the control device determines a state of fastening based on the captured image including the assembly position, after fastening the operation member at the assembly position by the operation execution unit, and removes the operation member from the operation execution unit, when it is determined that the fastening has failed.

With this configuration, the control device determines the state of fastening based on the captured image including the assembly position, after fastening the operation member at the assembly position by the operation execution unit, and removes the operation member from the operation execution unit, when it is determined that the fastening has failed. Therefore, the control device can remove the operation member which is supplied to and remaining on the operation execution unit according to the state of fastening of the operation member.

Still yet another aspect of the invention is directed to a control method of operating a robot including an operation execution unit, the method including: determining a state of fastening based on a captured image including an assembly position, after fastening an operation member at the assembly position by the operation execution unit, and removing the operation member from the operation execution unit, when it is determined that the fastening has failed.

With this configuration, the control method includes determining the state of fastening based on the captured image including the assembly position, after fastening the operation member at the assembly position by the operation execution unit, and removing the operation member from the operation execution unit, when it is determined that the fastening has failed. Therefore, in the control method, it is possible to remove the operation member which is supplied to and remains on the operation execution unit according to the state of fastening of the operation member.

As described above, the robot, the robot system, the control device, and the control method determine a state of fastening based on a captured image including an assembly position, after fastening an operation member at the assembly position by the operation execution unit, and remove the operation member from the operation execution unit, when it is determined that the fastening has failed. Therefore, the robot, the robot system, the control device, and the control method can remove the operation member which is supplied to and remains on the operation execution unit according to the state of fastening of the operation member.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiment

Hereinafter, embodiments of the invention will be described with reference to the drawings.

Figure 1:
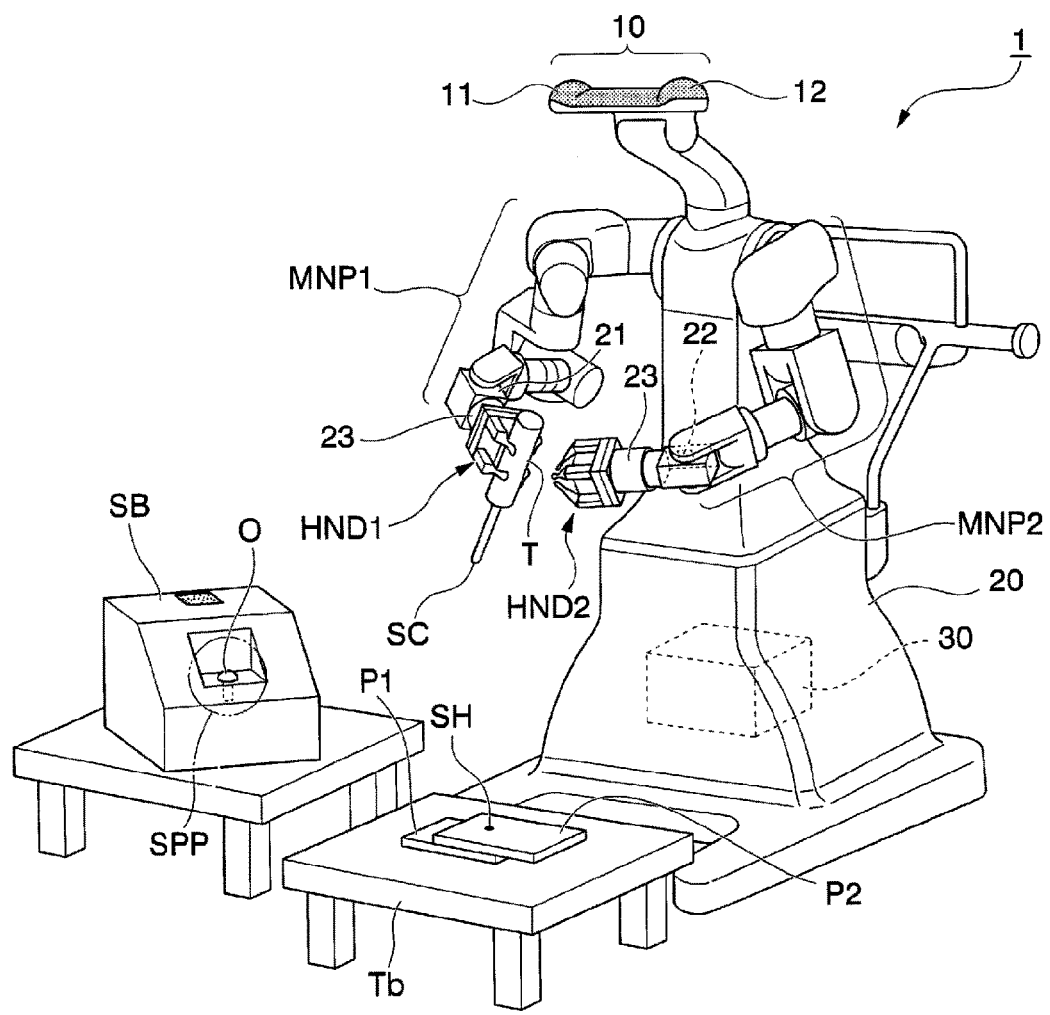
FIG. 1 is a diagram showing a configuration of a robot system 1 according to the embodiment.

FIG. 1 is a diagram showing a configuration of a robot system 1 according to the embodiment. The robot system 1 includes a robot 20 including four imaging units (a first fixed imaging unit 11, a second fixed imaging unit 12, a first movable imaging unit 21, and a second movable imaging unit 22), and a control device 30.

The robot system 1 images a range for the robot 20 to perform operations, by the first fixed imaging unit 11 and the second fixed imaging unit 12. Herein, the robot system 1 performs the imaging by the first fixed imaging unit 11 and the second fixed imaging unit 12. In the robot system 1, a first object P1 and a second object P2 which is assembled to the first object P1 by screwing are disposed to be overlapped with each other by the robot 20, based on a captured image which is captured by the first fixed imaging unit 11 and the second fixed imaging unit 12. At the time of performing this disposition, the robot system 1 disposes a jig Tb (in an example shown in FIG. 1, a table-shaped jig) so that a screw hole of the first object P1 and a screw hole of the second object P2 coincide with each other when these are seen from the top of the screw hole. Hereinafter, the positions of the screw holes at this time will be described by being collectively referred to as a predetermined screw fastening position SH. The screw fastening position SH is an example of an assembly position.

The first object P1 is, for example, set as a plate-shaped metal member, but instead of this, the first object P1 may be a plastic member or a wooden member. The shape thereof may also be any other shape, instead of the plate shape, as long as the first object P1 can be assembled to the second object P2 by screw fastening. The second object P2 is, for example, set as a plate-shaped metal member, but instead of this, the second object P2 may be a plastic member or a wooden member. The shape thereof may also be any other shape, instead of the plate shape, as long as the second object P2 can be assembled to the first object P1 by screw fastening.

After the first object P1 and the second object P2 are disposed on the jig Tb, the robot system 1 detects a position where an electric driver T is installed, in the captured image which is captured by the first fixed imaging unit 11 and the second fixed imaging unit 12, and causes the robot 20 to grasp the electric driver T based on the detected position. The robot system 1 supplies a screw O to a tip SC of the electric driver T from a material supply device SB by the electric driver T grasped by the robot 20.

Supplying the screw to the tip SC of the electric driver T means to adsorb the screw O to the tip SC of the electric driver T. Specifically, the supplying of the screw to the tip SC of the electric driver T means various states which are applied in the well-known technology, such as to magnetically attaching the screw O to the tip SC of the electric driver T or to adsorb the screw O to the tip SC of the electric driver T using air. In the embodiment, magnetically attaching the screw O to the tip SC of the electric driver T will be described as an example. The material supply device SB is a device which disposes (supplies) the screw O accommodated therein at a position SPP each time when the screw O is removed from the position SPP shown in FIG. 1.

After the screw O is supplied to the tip SC of the electric driver T, the robot system 1 moves the screw O supplied by the electric driver T to the screw fastening position SH and performs the screw fastening. Hereinafter, an operation performed by the robot system 1 after the screw fastening is performed will be described.

After the screw fastening is performed, the robot system 1 performs imaging at a position where the range including the screw fastening position SH can be imaged which is a position where a screw head of the screw O can be imaged when the screw O is fastened (hereinafter, referred to as a state imaging position), and determines the operation implementation state showing whether or not the screw O is fastened at the screw fastening position SH (that is, whether or not the operation is implemented) based on the captured image, by the presence of absence of the screw O. The operation implementation state is any one of a state where the screw O is fastened to the screw fastening position SH and a state where the screw O is not fastened to the screw fastening position SH due to a certain reason. The fastening is an example of the assembly. In addition, the operation implementation state is an example of the assembly state.

That is, in the robot system 1, when the screw head of the screw O is detected in the captured image, the operation implementation state is determined as a state where the screw O is fastened to the screw fastening position SH, and when the screw head of the screw O is not detected in the captured image, the operation implementation state is determined as a state where the screw O is not fastened to the screw fastening position SH. In the robot system 1, the captured image may be imaged by any one or more of the first fixed imaging unit 11, the second fixed imaging unit 12, the first movable imaging unit 21, and the second movable imaging unit 22. In the embodiment, a case where the captured image is captured by the second movable imaging unit 22 will be described as an example.

When it is determined that the operation implementation state is a state where the screw O is fastened to the screw fastening position SH, the robot system 1 ends the operation, for example. When it is determined that the operation implementation state is not a state where the screw O is fastened to the screw fastening position SH, the robot system 1 performs an operation of removing the screw O from the tip SC of the electric driver T. By performing this operation, even when the screw O which has failed to be fastened to the screw fastening position SH remains on the tip SC of the electric driver T, the robot system 1 can remove the screw O and supply the next new screw O to the tip SC of the electric driver T. After performing the operation of removing the screw O from the tip SC of the electric driver T, the robot system 1 controls the robot 20 so that the new screw O is supplied to the tip SC of the electric driver T and the screw O is fastened to the screw fastening position SH.

Hereinafter, for convenience of description, the expression that the operation implementation state is a state where the screw O is fastened to the screw fastening position SH will be described by being referred to as that the screw O is fastened to the screw fastening position SH. In addition, the expression that the operation implementation state is a state where the screw O is not fastened to the screw fastening position SH will be described by being referred to as that the screw O is not fastened to the screw fastening position SH.

In the robot system 1, a configuration in which the robot 20 grasps the electric driver T is used, but instead of this, the robot may grasp any other tools usable by a person or any other tools dedicated for the robot. The tools usable by a person are a ratchet handle, a spanner, and the like, for example. In a case where the tool is a ratchet handle, a target to be supplied is a ratchet socket, instead of the screw O, and in a case where the tool is a spanner, a target to be supplied is a bolt or a nut, instead of the screw O. The tool dedicated for the robot is an electric driver provided in a manipulator of the robot as an end effector, and the like. The electric driver T (that is, the tool) is an example of a target to be grasped. In addition, the screw O is an example of an operation member.

The robot 20 is a double arm robot including an imaging unit 10, the first movable imaging unit 21, the second movable imaging unit 22, a force sensor 23, the grasping unit HND1, the grasping unit HND2, a manipulator MNP1, a manipulator MNP2, and a plurality of actuators (not shown). The double arm robot indicates a robot including two arms which are an arm configured with the grasping unit HND1 and the manipulator MNP1 (hereinafter, referred to as a first arm) and an arm configured with the grasping unit HND2 and the manipulator MNP2 (hereinafter, referred to as a second arm).

The robot 20 may be a single arm robot, instead of a double arm robot. A single arm robot indicates a robot including one arm and, for example, indicates a robot including any one of the first arm and the second arm. The robot 20 further includes the control device 30 embedded therein and is controlled by the embedded control device 30. The robot 20 may be controlled by the externally-installed control device 30, instead of using the configuration of the embedded control device 30.

The first arm is a six-axial vertical articulated type. A support table, the manipulator MNP1, and the grasping unit HND1 can perform an operation having degrees of freedom in six axes by a joint operation by the actuators. The first arm includes the first movable imaging unit 21 and the force sensor 23.

The first movable imaging unit 21 is, for example, a camera including a charge coupled device (CCD) or a complementary metal oxide semiconductor (CMOS) which is an imaging device converting condensed light into an electric signal.

The first movable imaging unit 21 is connected to the control device 30 through a cable to communicate with the control device. Wired communication through the cable is performed based on standards such as Ethernet (registered trademark) or universal serial bus (USB), for example. The first movable imaging unit 21 and the control device 30 may be connected to each other through wireless communication performed based on communication standards such as Wi-Fi (registered trademark).

As shown in FIG. 1, the first movable imaging unit 21 is included in a part of the manipulator MNP1 configuring the first arm and can be moved by the movement of the first arm. When the electric driver T is grasped by the grasping unit HND2, the first movable imaging unit 21 is moved by to the state imaging position by the movement of the first arm and captures a still image of a range including the screw fastening position SH as a first movingly-captured image from the state imaging position. The first movable imaging unit 21 is configured to captures the still image as the first movingly-captured image, but may be configured to captures a moving image as the first movingly-captured image.

The force sensor 23 included in the first arm is included between the grasping unit HND1 and the manipulator MNP1 of the first arm. The force sensor 23 detects a force or a moment operating on the grasping unit HND1 (or the electric driver T grasped by the grasping unit HND1). The force sensor 23 outputs information regarding the detected force or moment to the control device 30 through a communication. The information regarding the force or moment detected by the force sensor 23 is, for example, used in compliant motion control of the robot 20 by the control device 30.

The second arm is a six-axial vertical articulated type. A support table, the manipulator MNP2, and the grasping unit HND2 can perform an operation having degrees of freedom in six axes by a joint operation by the actuators. The second arm includes the second movable imaging unit 22 and the force sensor 23.

The second movable imaging unit 22 is, for example, a camera including a CCD or a CMOS which is an imaging device converting condensed light into an electric signal.

The second movable imaging unit 22 is connected to the control device 30 through a cable to communicate with the control device. Wired communication through the cable is performed based on standards such as Ethernet (registered trademark) or USB, for example. The second movable imaging unit 22 and the control device 30 may be connected to each other through wireless communication performed based on communication standards such as Wi-Fi (registered trademark).

As shown in FIG. 1, the second movable imaging unit 22 is included in a part of the manipulator MNP2 configuring the second arm and can be moved by the movement of the second arm. When the electric driver T is grasped by the grasping unit HND1, the second movable imaging unit 22 moves to the state imaging position by the movement of the second arm and captures a still image of a range including the screw fastening position SH as a second movingly-captured image from the state imaging position. The second movable imaging unit 22 is configured to image the still image as the second movingly-captured image, but may be configured to image a moving image as the second movingly-captured image. The second movingly-captured image is an example of the captured image.

The force sensor 23 included in the second arm is included between the grasping unit HND2 and the manipulator MNP2 of the second arm. The force sensor 23 detects a force or a moment operating on the grasping unit HND2 (or the electric driver T grasped by the grasping unit HND2). The force sensor 23 outputs information regarding the detected force or moment to the control device 30 through the communication. The information regarding the force or moment detected by the force sensor 23 is, for example, used in compliant control of the robot 20 by the control device 30.

Each of the first arm and the second arm may perform an operation with five or less degrees of freedom (five axes) or may perform an operation with seven or more degrees of freedom (seven axes). Hereinafter, an operation of the robot 20 performed by the first arm and the second arm will be described. The grasping unit HND1 and the grasping unit HND2 of the robot 20 respectively include claw portions which can grasp an object. Accordingly, the robot 20 can grasp the electric driver T by one or both of the grasping unit HND1 and the grasping unit HND2.

The imaging unit 10 includes the first fixed imaging unit 11 and the second fixed imaging unit 12 and is a stereo imaging unit configured with the two imaging units. Instead of being configured with the two imaging units, the imaging unit 10 may be configured with three or more imaging units, or may capture a two-dimensional image with one camera. In the embodiment, as shown in FIG. 1, the imaging unit 10 is installed on a head portion of the robot 20 as a part of the robot 20, but instead of this, the imaging unit may be configured to be installed at a position different from the robot 20 as a separate body from the robot 20.

The first fixed imaging unit 11 is, for example, a camera including a CCD or a CMOS which is an imaging device converting condensed light into an electric signal. The first fixed imaging unit 11 is connected to the control device 30 through a cable to communicate with the control device. Wired communication through the cable is performed based on standards such as Ethernet (registered trademark) or USB, for example. The first fixed imaging unit 11 and the control device 30 may be connected to each other through wireless communication performed based on communication standards such as Wi-Fi (registered trademark).

The first fixed imaging unit 11 is installed in a position where the range including the material supply device SB (hereinafter, referred to as an operation area) can be imaged as a range in which the robot 20 performs an operation. Hereinafter, a still image captured by the first fixed imaging unit 11 will be described by being referred to as the first fixedly-captured image. The first fixed imaging unit 11 has a configuration of capturing the still image as a first fixedly-captured image, but instead of this, the first fixed imaging unit may have a configuration of imaging a moving image as the first fixedly-captured image. When imaging the range including the screw fastening position SH by the first fixed imaging unit 11, the first fixed imaging unit 11 is installed at a position where the range including the operation area can be imaged which is a position where the range including the screw fastening position SH can be imaged.

The second fixed imaging unit 12 is, for example, a camera including a CCD or a CMOS which is an imaging device converting condensed light into an electric signal. The second fixed imaging unit 12 is connected to the control device 30 through a cable to communicate with the control device. Wired communication through the cable is performed based on standards such as Ethernet (registered trademark) or USB, for example. The second fixed imaging unit 12 and the control device 30 may be connected to each other through wireless communication performed based on communication standards such as Wi-Fi (registered trademark).

The second fixed imaging unit 12 is installed in a position where the operation range which is the same as that of the first fixed imaging unit 11 (operation area) can be imaged. Hereinafter, the still image captured by the second fixed imaging unit 12 will be described by being referred to as the second fixedly-captured image. The second fixed imaging unit 12 has a configuration of imaging the still image of the operation area as the second fixedly-captured image, but instead of this, the second fixed imaging unit may have a configuration of imaging a moving image of the operation area as the second fixedly-captured image. When imaging the range including the screw fastening position SH by the second fixed imaging unit 12, the second fixed imaging unit 12 is installed at a position where the same imaging range (operation area) as that of the first fixed imaging unit 11 can be imaged which is a position where the range including the screw fastening position SH can be imaged. Hereinafter, for convenience of description, the first fixedly-captured image and the second fixedly-captured image will be described by being collectively referred to as a stereo captured image.

The robot 20 is, for example, connected to the control device 30 embedded in the robot 20 through a cable to communicate with the control device. Wired communication through the cable is performed based on standards such as Ethernet (registered trademark) or USB, for example. The robot 20 and the control device 30 may be connected to each other through wireless communication performed based on communication standards such as Wi-Fi (registered trademark).

In the embodiment, the robot 20 having a configuration of acquiring a control signal from the control device 30 embedded in the robot 20, supplying the screw O from the material supply device SB by the electric driver T grasped by the grasping unit HND1 of the robot 20, and fastening the supplied screw O to the screw fastening position SH, will be described. In addition, the robot 20 moves the second movable imaging unit 22 to the state imaging position by the second arm and captures the second movingly-captured image by the second movable imaging unit 22.

Figure 2:
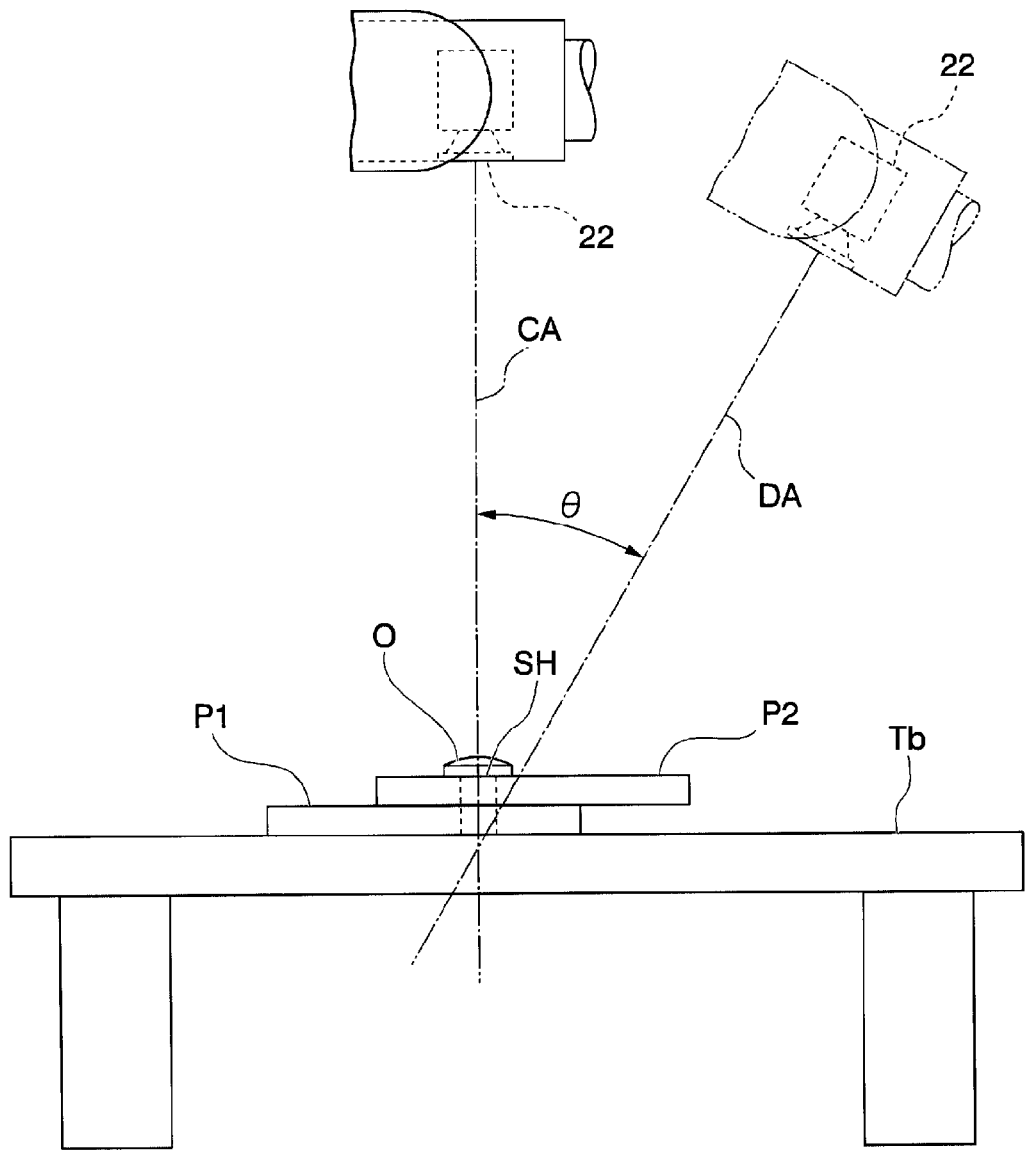
FIG. 2 is a diagram showing an example of a state where a range including a screw fastening position is imaged by a second movable imaging unit in a state imaging position.

Herein, the imaging performed by the second movable imaging unit 22 at the state imaging position will be described with reference to FIG. 2. FIG. 2 is a diagram showing an example of a state where the range including the screw fastening position SH is imaged by the second movable imaging unit 22 at the state imaging position. FIG. 2 shows only a cut-out part of the second movable imaging unit 22 of the second arm.

The robot 20 moves the second movable imaging unit 22 to the state imaging position by moving the second arm. More specifically, as shown in FIG. 2, the state imaging position is a position for performing the imaging from vertically top to the bottom along a central axis CA of the screw fastening position SH, but instead of this, the state imaging position may be other positions where the screw head of the screw O can be imaged, such as a position where the screw head of the screw O can be imaged which is a position on an extension line DA in a direction inclined by an angle θ with respect to the central axis vertically upwards the screw fastening position SH.

When the control device 30 determines that the screw O is not fastened to the screw fastening position SH based on the second movingly-captured image which is captured by the second movable imaging unit 22 from the state imaging position, the robot 20 performs an operation of removing the screw O from the tip SC of the electric driver T based on the control signal from the control device 30. The robot 20 supplies another screw O from the material supply device SB and fastens the re-supplied screw O to the screw fastening position SH, based on the control signal from the control device 30.

In the following description, the operation performed by the first arm may be performed by the second arm and the operation performed by the second arm may be performed by the first arm. That is, the robot 20 may have a configuration in which the electric driver T is grasped by the grasping unit HND2, instead of a configuration in which the electric driver T is grasped by the grasping unit HND1. In this case, the operations performed by the first arm and the second arm are switched in the following description.

The control device 30 detects the position of the material supply device SB based on the stereo captured image which is captured by the imaging unit 10. The control device 30 may have a configuration of detecting the position of the material supply device SB based on any one of the first fixedly-captured image and the second fixedly-captured image which is captured by any one of the first fixed imaging unit and the second fixed imaging unit 12, instead of a configuration of detecting the position of the material supply device SB based on the stereo captured image. In addition, the control device 30 may have a configuration of detecting the position of the material supply device SB based on any one of the first movingly-captured image and the second movingly-captured image which is obtained by imaging the operation area by any one of the first movable imaging unit 21 and the second movable imaging unit 22.

The control device 30 controls the robot 20 so that the screw O is supplied by the tip SC of the electric driver T grasped by the grasping unit HND1 of the first arm, based on the detected position of the material supply device SB. After the screw O is supplied by the tip SC of the electric driver T, the control device 30 controls the robot 20 so that the robot fastens the screw O to the screw fastening position SH.

The control device 30 controls the robot 20 so that the robot moves the second arm, to move the second movable imaging unit 22 to the state imaging position. The control device 30 causes the second movable imaging unit 22 to capture the second movingly-captured image at the state imaging position and determines the operation implementation state based on the imaged second movingly-captured image. At that time, the control device 30, for example, performs the determination described above depending on the fact of whether or not the screw head of the screw O is detected from the screw fastening position SH on the second movingly-captured image by pattern matching or the like.

As a result of the determination, when the screw head is detected, the control device 30 determines that the operation implementation state is a state where the screw O is fastened to the screw fastening position SH, controls the robot 20 to move the electric driver T to a predetermined standby position, for example, and ends the process. Meanwhile, as a result of the determination, when the screw head is not detected, the control device 30 determines that the operation implementation state is a state where the screw O is not fastened to the screw fastening position SH, and controls the robot 20 to perform the operation of removing the screw O from the tip SC of the electric driver T.

The control device 30 has a configuration of determining the operation implementation state from the fact of whether or not the screw head of the screw O is detected from the screw fastening position SH on the second movingly-captured image, but instead of this, the control device may have a configuration of detecting a part or the entire shape relating to the screw O such as the tip of the screw O or the shaft of the screw O, and determining the operation implementation state based on the detected part or the entire shape relating to the screw O. In this case, the robot system 1 checks the position state of the screw O by the imaging unit (for example, camera) or photodiode.

After the robot 20 performs the operation of removing the screw O from the tip SC of the electric driver T, the control device 30 controls the robot 20 to supply the screw O to the tip SC of the electric driver T again and fasten the supplied screw O to the screw fastening position SH. The control device 30 may have a configuration of performing other operations (for example, operation of stopping the operation), instead of the configuration of re-supplying the screw O to the tip SC of the electric driver T and fastening the supplied screw O to the screw fastening position SH, after performing the operation of removing the screw O from the tip SC of the electric driver T.

The control device 30 has a configuration of performing the operations such as the supplying of the screw O from the material supply device SB, the fastening of the screw O to the screw fastening position SH, or the removing of the screw O from the tip SC of the electric driver T, so as not to break the material supply device SB or the screw O by a visual servo or compliant motion control, but instead of this, the control device may have a configuration of not performing the compliant motion control or may have a configuration of controlling the robot 20 by any method other than the visual servo. One or both of the grasping unit HND1 and the grasping unit HND2, and the electric driver T are an example of an operation execution unit.

Figure 3:
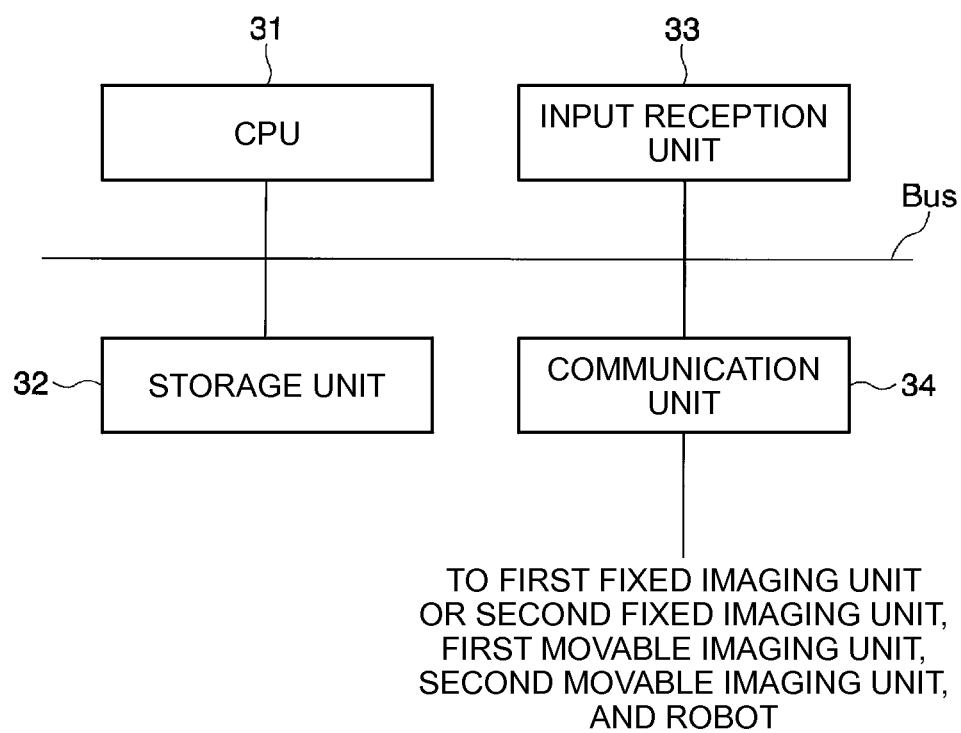
FIG. 3 is a diagram showing an example of a hardware configuration of a control device.

Next, a hardware configuration of the control device 30 will be described with reference to FIG. 3. FIG. 3 is a diagram showing an example of the hardware configuration of the control device 30. The control device 30, for example, includes a central processing unit (CPU) 31, a storage unit 32, an input reception unit 33, and a communication unit 34, and communicates with the robot 20 through the communication unit 34. The constituent elements are connected to each other through a bus so as to communicate with each other. The CPU 31 executes various programs stored in the storage unit 32.

The storage unit 32, for example, includes a hard disk drive (HDD) or solid state drive (SSD), an electrically erasable programmable read-only memory (EEPROM), a read-only memory (ROM), a random access memory (RAM), or the like, and stores various information items or images and programs to be processed by the control device 30. The storage unit 32 may be an external storage device connected by a digital input and output port of a USB or the like, instead of the unit built into the control device 30.

The input reception unit 33 is, for example, a keyboard or a mouse, a touch pad, and other input devices. The input reception unit 33 may function as a display unit and may be configured as a touch panel.

The communication unit 34 is, for example, configured to include a digital input and output port of a USB or Ethernet (registered trademark) port.

Figure 4:
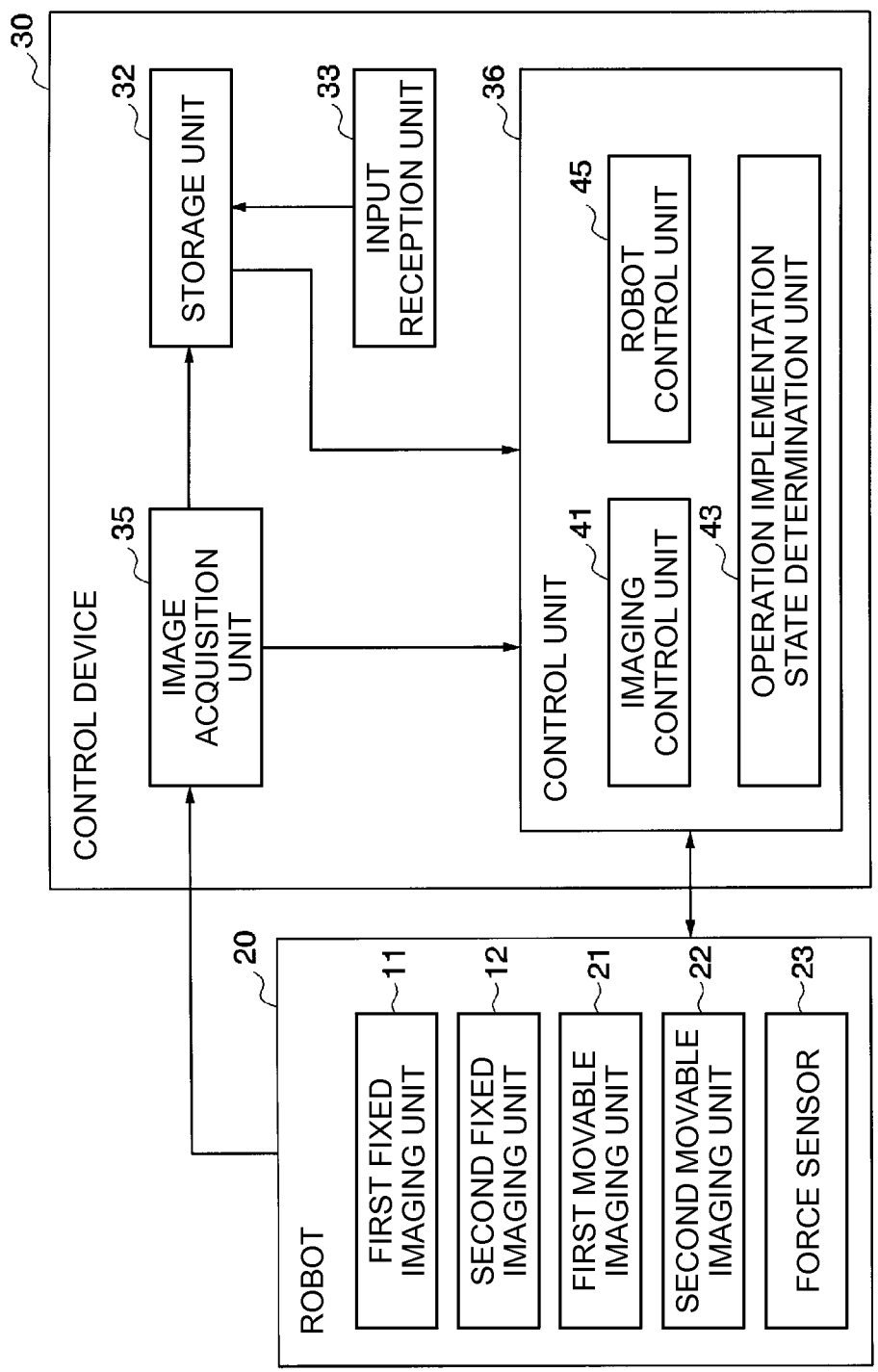
FIG. 4 is a diagram showing an example of a functional configuration of the control device.

Next, a functional configuration of the control device 30 will be described with reference to FIG. 4. FIG. 4 is a diagram showing an example of a functional configuration of the control device 30. The control device 30 includes the storage unit 32, an image acquisition unit 35, and a control unit 36. Some or all of the functional units included in the control unit 36 are realized by executing various programs stored in the storage unit 32 by the CPU 31, for example. Some or all of the functional units may be hardware functional units such as large scale integration (LSI) or an application specific integrated circuit (ASIC).

The image acquisition unit 35 acquires the stereo captured image which is captured by the imaging unit 10 from the robot 20. The image acquisition unit 35 outputs the acquired stereo captured image to the control unit 36. The image acquisition unit 35 acquires the first movingly-captured image which is captured by the first movable imaging unit 21 from the robot 20. The image acquisition unit 35 outputs the acquired first movingly-captured image to the control unit 36. The image acquisition unit 35 acquires the second movingly-captured image which is captured by the second movable imaging unit 22 from the robot 20. The image acquisition unit 35 outputs the acquired second movingly-captured image to the control unit 36.

The control unit 36 includes an imaging control unit 41, an operation implementation state determination unit 43, and a robot control unit 45.

The imaging control unit 41 controls the imaging unit 10 so that the imaging unit captures the stereo captured image. More specifically, the imaging control unit 41 controls the first fixed imaging unit 11 so that the first fixed imaging unit captures the first fixedly-captured image, and controls the second fixed imaging unit 12 so that the second fixed imaging unit captures the second fixedly-captured image. The imaging control unit 41 controls the first movable imaging unit 21 so that the first movable imaging unit captures the first movingly-captured image. The imaging control unit 41 controls the second movable imaging unit 22 so that the second movable imaging unit captures the second movingly-captured image.

The operation implementation state determination unit 43 reads an image previously stored in the storage unit 32 which is an image (captured image or computer graphics (CG)) in a state where the screw O is fastened to the screw fastening position SH. The operation implementation state determination unit 43 determines whether or not the screw O is fastened to the screw fastening position SH (operation implementation state), by determining whether or not the screw head of the screw O is detected by the pattern matching in the first movingly-captured image or the second movingly-captured image based on the read images. The operation implementation state determination unit 43 may have a configuration of detecting the screw head of the screw O by other methods such as a method of detecting the screw head of the screw O by edge detection, for example, instead of the configuration of detecting the screw head by the pattern matching.

The robot control unit 45 controls the robot 20 to supply the screw O by the tip SC of the electric driver T by the visual servo, for example, based on the position of the screw O detected by pattern matching or the like based on the stereo captured image which is captured by the imaging unit 10. After the screw O is supplied by the electric driver T, the robot control unit 45 controls the robot 20 to fasten the screw O to the screw fastening position SH by the electric driver T, by moving the arm (first armor second arm) grasping the electric driver T. When it is determined that the operation implementation state is a state where the screw O is not fastened to the screw fastening position SH, by the operation implementation state determination unit 43, the robot control unit 45 controls the robot 20 to perform the operation of removing the screw O from the tip SC of the electric driver T. After the robot 20 performs the operation of removing the screw O from the tip SC of the electric driver T, the robot control unit 45 controls the robot 20 to supply the screw O again by the tip SC of the electric driver T and to fasten the supplied screw O to the screw fastening position SH.

Figure 5:
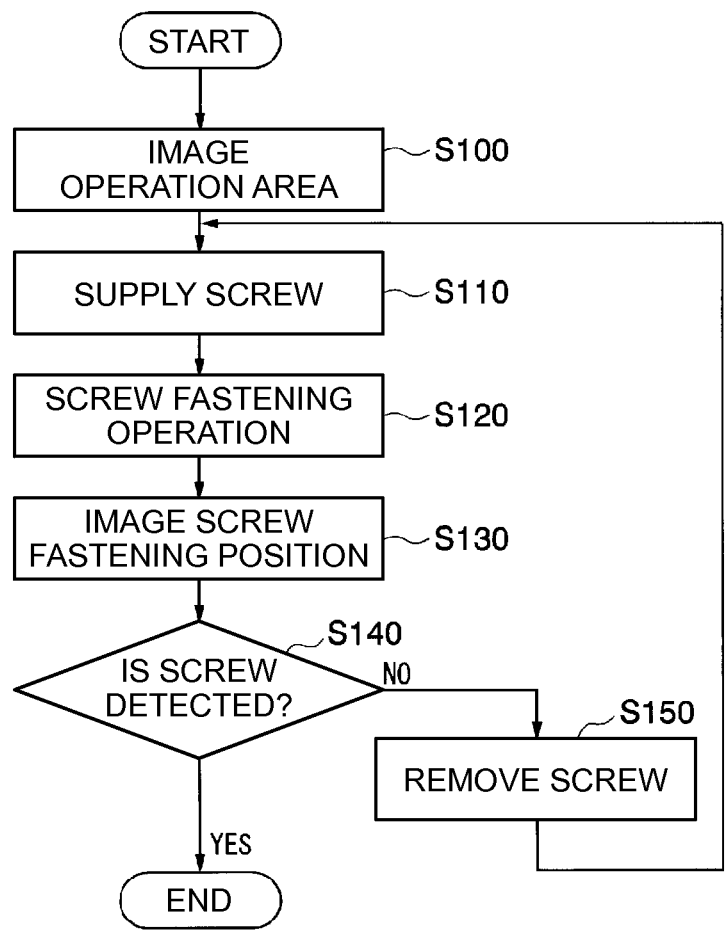
FIG. 5 is a flowchart showing an example of a flow of a process of determining an operation implementation state by the control device.

Hereinafter, a process of determining the operation implementation state by the control device 30 will be described with reference to FIG. 5. FIG. 5 is a flowchart showing an example of a flow of the process of determining the operation implementation state by the control device 30.

First, the imaging control unit 41 controls the imaging unit 10 to capture the stereo captured image of the operation area. The control unit 36 acquires the stereo captured image which is captured by the imaging unit 10 by the image acquisition unit 35 (Step S100).

Next, the robot control unit 45 controls the robot 20 to supply the screw O by the tip SC of the electric driver T based on the stereo captured image acquired in Step S100 (Step S110). The robot control unit 45 may have a configuration of supplying the screw O by the tip SC of the electric driver T based on any one of the first fixedly-captured image and the second fixedly-captured image, instead of the configuration of supplying the screw O by the tip SC of the electric driver T based on the stereo captured image. In this case, the imaging control unit 41 controls any one of the first fixed imaging unit 11 and the second fixed imaging unit 12 to capture any one of the first fixedly-captured image and the second fixedly-captured image of the operation area in Step S100. The control unit 36 acquires any one of the first fixedly-captured image and the second fixedly-captured image which is captured by any one of the first fixed imaging unit 11 and the second fixed imaging unit 12, by the image acquisition unit 35. The control device 30 may have a configuration of supplying the screw O by the tip SC of the electric driver T based on any one of the first movingly-captured image and the second movingly-captured image which is obtained by imaging the operation area by any one of the first movable imaging unit 21 and the second movable imaging unit 22.

Next, the robot control unit 45 controls the robot 20 to fasten the screw O supplied in Step S110 to the screw fastening position SH (Step S120). Then, the robot control unit 45 moves the electric driver T having the screw O supplied to the tip SC thereof to a predetermined position (for example, a position where the first arm does not come in contact with the second arm, when the second movable imaging unit 22 captures the second movingly-captured image from the state imaging position), by moving the first arm of the robot 20. After that, the robot control unit 45 controls the robot 20 so that the second movable imaging unit 22 moves to the state imaging position. The imaging control unit 41 controls the second movable imaging unit 22 to image the range including the screw fastening position SH as the second movingly-captured image (Step S130).

Next, the control unit 36 acquires the second movingly-captured image captured in Step S130 from the image acquisition unit 35. The operation implementation state determination unit 43 determines the operation implementation state by determining whether or not the screw O is detected by the pattern matching in the acquired second movingly-captured image (Step S140). When it is determined that the operation implementation state is a state where the screw O is not fastened to the screw fastening position SH (Step S140—No), the robot control unit 45 controls the robot 20 to perform the operation of removing the screw O from the tip SC of the electric driver T (Step S150). After that the process returns to Step S110 and the screw O is supplied again by the tip SC of the electric driver T. On the other hand, when it is determined that the operation implementation state is a state where the screw O is fastened to the screw fastening position SH (Step S140—Yes), the robot control unit 45 moves the second arm to the initial position and ends the process, for example.

Figure 6A:
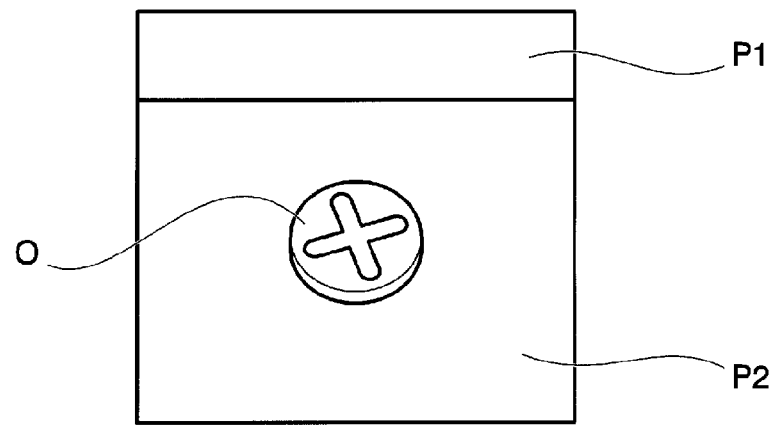
FIGS. 6A and 6B are diagrams showing examples of second movingly-captured images in each operation implementation state.
Figure 6B:
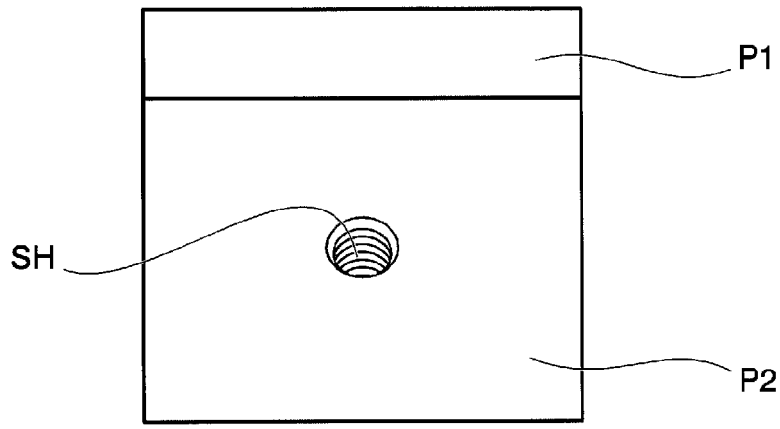

Herein, the operation implementation state determined based on the second movingly-captured image will be described with reference to FIGS. 6A and 6B. FIGS. 6A and 6B illustrate diagrams showing each example of the second movingly-captured image in each operation implementation state. FIG. 6A shows an example of the second movingly-captured image in a case where the screw O is fastened to the screw fastening position SH. In this case, as shown in FIG. 6A, in the second movingly-captured image, the screw head of the screw O is imaged at a position (screw fastening position SH) where the screw holes of the first object P1 and the second object P2 coincide with each other. Accordingly, the operation implementation state determination unit 43 detects the screw head by the pattern matching and determines that the operation implementation state is the state where the screw O is fastened to the screw fastening position SH.

Meanwhile, FIG. 6B shows an example of the second movingly-captured image in a case where the screw O is not fastened to the screw fastening position SH. In this case, as shown in FIG. 6B, in the second movingly-captured image, the screw O is not imaged at a position (screw fastening position SH) where screw holes of the first object P1 and the second object P2 coincide with each other, and the screw hole of the screw fastening position SH is imaged. Accordingly, the operation implementation state determination unit 43 does not detect the screw head by the pattern matching and determines that the operation implementation state is the state where the screw O is not fastened to the screw fastening position SH.

The operation implementation state is any one of the state where the screw O is fastened to the screw fastening position SH (that is, the state where the operation is implemented) and the state where the screw O is not fastened to the screw fastening position SH (that is, the state where the operation is not implemented), but instead of this, the operation implementation state may be any of three or more of plurality of states. In this case, the robot system 1 may perform different operations depending on the determined operation implementation state (or arbitrary combinations thereof).

As described above, after the screw O is fastened to the screw fastening position SH by the grasping unit HND1 or the grasping unit HND2, the robot system 1 according to the embodiment determines the state of fastening based on the second movingly-captured image including the screw fastening position SH, and removes the screw O from the grasping unit HND1 or the grasping unit HND2, when it is determined that the fastening has failed. Accordingly, the robot system 1 can remove the screw O which is supplied to and remains on the grasping unit HND1 or the grasping unit HND2 according to the state of the fastening of the screw O.

In addition, the robot system. 1 determines the state of the fastening from the fact of whether or not the screw O is detected at the screw fastening position SH in the second movingly-captured image. Accordingly, the robot system 1 can perform different operations in a case where screw O is detected at the screw fastening position SH in the second movingly-captured image and in a case where screw O is not detected at the screw fastening position SH in the second movingly-captured image.

The robot system 1 grasps the electric driver T by the grasping unit HND1 or the grasping unit HND2 and fastens the screw O to the screw fastening position SH by the electric driver T. Accordingly, the robot system 1 can perform the operation according to the operation implementation state by the electric driver T.

In addition, the robot system 1 determines the operation implementation state regarding the fastening of the screw O to the screw fastening position SH based on the second movingly-captured image by the pattern matching. Accordingly, the robot system 1 can determine the operation implementation state using the pattern matching.

When the operation of removing the screw O is performed from the tip SC of the electric driver T, the robot system 1 fastens the screw O to the screw fastening position SH again. Accordingly, even when the fastening of the screw O to the screw fastening position SH has failed, for example, an additional operation by a user is not necessary, and the robot system 1 can perform the fastening of the screw O to the screw fastening position SH again.

Hereinabove, the embodiments of the invention have been described with reference to the drawings, but the specific configuration is not limited to the embodiments, and modifications, replacement, and removal may be performed within a range of not departing from a gist of the invention.

The program for realizing the functions of the arbitrary configuration units of the device described above (for example, the control device 30 of the robot system 1) may be recorded in a computer-readable recording medium and may cause a computer system to read and execute programs. The "computer system" herein includes an operating system (OS) or hardware of peripherals or the like. The "computer-readable recording medium" is a portable medium such as a flexible disk, a magnetooptical disk, a read only memory (ROM), or a compact disk (CD)-ROM, or a recording device such as a hard disk embedded in a computer system. In addition, the "computer-readable recording medium" includes a medium storing a program for a certain time, as a volatile memory (random access memory: RAM) in a computer system which is a server or a client when a program is transmitted through a network such as the Internet or a communication line such as a telephone line.

The program may be transmitted to another computer system through a transmission medium or by a transmitted wave in the transmission medium, from the computer system including the program stored in the recording device and the like. Herein, the "transmission medium" for transmitting the program is a medium having a function of transmitting the information such as a network (communication net) such as the Internet or a communication line such as a telephone line.

The program may be a program for realizing some of the functions described above. The program may be a so-called differential file (differential program) which can realize the functions described above in combination with a program which is already recorded in the computer system.

The entire disclosure of Japanese Patent Application No. 2014-114287, filed Jun. 2, 2014 is expressly incorporated by reference herein.

What is claimed is:

1. A robot comprising:
   an operation execution unit;
   at least one fixed imaging unit, a first movable imaging unit, and a second movable imaging unit, wherein the at least one fixed imaging unit is positioned on a head, the first movable imaging unit is positioned on a first arm, and the second movable imaging unit is positioned on a second arm; and
   a control device including a control unit configured to control the operation execution unit,
   wherein the control unit receives a first captured image from the at least one fixed imaging unit, the first captured imaging including an operation area without an operation member,
   the control unit commands the operation execution unit to assemble the operation member to the operation area based on the first captured image,
   wherein the control unit receives a second captured image from each of the first movable imaging unit and the second movable imaging unit, the second captured images including an assembly position of the operation member,
   the control unit determines a state of fastening based on at least one of the second captured images from the first movable imaging unit and the second movable imaging unit after the operation execution unit fastens the operation member at the assembly position, and
   when the control unit determines that the fastening has failed from the second captured images, the control unit commands the operation execution unit to remove the operation member from the operation execution unit.

2. The robot according to claim 1,
   wherein the control unit determines the state of the fastening from the fact of whether or not the operation member is detected at the assembly position in the at least one second captured images.

3. The robot according to claim 1,
   wherein the control unit grasps a target to be grasped by the operation execution unit and assembles the operation member at the assembly position by the target to be grasped.

4. The robot according to claim 1,
   wherein the control unit determines the state of the fastening based on the at least one second captured images by pattern matching.

5. The robot according to claim 1,
   wherein the control unit assembles the operation member or a new operation member at the assembly position again by the operation execution unit, when the removing operation is performed.

6. A robot system comprising:
   a robot including an operation execution unit;
   a control device including a control unit configured to control the operation execution unit; and
   at least one fixed imaging unit, a first movable imaging unit, and a second movable imaging unit, wherein the at least one fixed imaging unit is positioned on a head, the first movable imaging unit is positioned on a first arm, and the second movable imaging unit is positioned on a second arm and wherein at least one of the at least one fixed imaging unit, the first movable imaging unit, and the second movable imaging unit captures a captured image including an assembly position where an operation member is assembled,
   wherein the robot determines a state of fastening based on the captured image including the assembly position,
   wherein the control unit receives a first captured image from the at least one fixed imaging unit, the first captured imaging including an operation area without the operation member,
   the control unit commands the operation execution unit to assemble the operation member to the operation area based on the first captured image,
   wherein the control unit receives a second captured image from each of the first movable imaging unit and the second movable imaging unit, the second captured images including the assembly position of the operation member,
   the control unit determines the state of fastening based on at least one of the second captured images from the first movable imaging unit and the second movable imaging unit after the operation execution unit fastens the operation member at the assembly position, and
   when the control unit determines that the fastening has failed from the at least one second captured images, the control unit commands the operation execution unit to remove the operation member from the operation execution unit.

7. A control method of operating a robot including an internal control device, an operation execution unit, at least one fixed imaging unit, a first movable imaging unit, and a second movable imaging unit, wherein the at least one fixed imaging unit is positioned on a head of the robot, the first movable imaging unit is positioned on a first arm of the robot, and the second movable imaging unit is positioned on a second arm of the robot, the method comprising:
   receiving a first captured image from the at least one fixed imaging unit, the first captured imaging including an operation area without an operation member;
   commanding the operation execution unit to assemble the operation member to the operation area based on the first captured image;
   receiving a second captured image from each of the first movable imaging unit and the second movable imaging unit, the second captured images including an assembly position of the operation member;
   determining a state of fastening based on at least one of the second captured images from the first movable imaging unit and the second movable imaging unit after the operation member is fastened at the assembly position; and
   commanding the operation execution unit to remove the operation member from the operation execution unit when the state of fastening is determined to be failed.

* * * * *